US 11,858,288 B2

(12) United States Patent
Houck

(10) Patent No.: US 11,858,288 B2
(45) Date of Patent: Jan. 2, 2024

(54) FANO RESONANCE BASED OPTICAL COMPONENT OF A SECURITY ARTICLE

(71) Applicant: VIAVI Solutions Inc., San Jose, CA (US)

(72) Inventor: William D. Houck, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 160 days.

(21) Appl. No.: 17/302,812

(22) Filed: May 12, 2021

(65) Prior Publication Data

US 2022/0363084 A1 Nov. 17, 2022

(51) Int. Cl.
| | |
|---|---|
| *G02B 5/28* | (2006.01) |
| *B42D 25/36* | (2014.01) |
| *G02B 5/26* | (2006.01) |
| *G06K 19/07* | (2006.01) |
| *B42D 25/23* | (2014.01) |
| *G07D 7/1205* | (2016.01) |
| *B42D 25/29* | (2014.01) |

(52) U.S. Cl.
CPC .............. *B42D 25/36* (2014.10); *G02B 5/26* (2013.01); *G02B 5/288* (2013.01); *G06K 19/07* (2013.01); *B42D 25/23* (2014.10); *B42D 25/29* (2014.10); *G07D 7/1205* (2017.05); *G07D 2207/00* (2013.01)

(58) Field of Classification Search
CPC .... G02B 5/288; G02B 5/0825; G02B 5/0875; G02B 1/00; G02B 1/10; G02B 5/003; G02B 5/08; G02B 5/0808; G02B 5/0816; G02B 5/0833; G02B 5/20; G02B 5/201; G02B 5/207; G02B 5/208; G02B 5/22; G02B 5/26; G02B 5/28; G02B 5/281; G02B 5/282; G02B 5/284; G02B 5/285; G02B 5/286
USPC ....... 359/584, 577, 580, 582, 583, 585, 586, 359/588, 589, 590, 885, 890, 892
See application file for complete search history.

(56) References Cited

U.S. PATENT DOCUMENTS

| | | | | |
|---|---|---|---|---|
| 2017/0276848 | A1* | 9/2017 | Sinclair | G01J 3/1256 |
| 2021/0172791 | A1* | 6/2021 | Le Neel | G02B 5/20 |
| 2022/0308264 | A1* | 9/2022 | ElKabbash | G02B 1/005 |

OTHER PUBLICATIONS

Listing of claims for U.S. Appl. No. 17/302,810, filed Feb. 21, 2023. (Year: 2023).*

(Continued)

*Primary Examiner* — Arnel C Lavarias
(74) *Attorney, Agent, or Firm* — Harrity & Harrity, LLP

(57) ABSTRACT

A security article includes an optical component that includes a plurality of optical channels with a Fano resonance characteristic. An optical channel, of the plurality of optical channels, is configured to pass a first portion of a first set of light beams (that are associated with a first wavelength range) when the first set of light beams falls incident on at least one of a first surface or a second surface of the optical channel, reflect a second portion of the first set of light beams when the first set of light beams falls incident on the first surface of the optical channel, and reflect at least a portion of a second set of light beams (that are associated with a second wavelength range) when the second set of light beams falls incident on the second surface of the optical channel.

20 Claims, 13 Drawing Sheets

(56) References Cited

OTHER PUBLICATIONS

Mohamed Elkabbash, et al.; "Fano-resonant ultrathin film optical coatings"; Supplementary Information; Natureresearch; 23 pages.
Mohamed Elkabbash, et al.; "Fano-resonant ultrathin film optical coatings"; Nature Nanotechnology; Springer Nature; 11 pages.
Mikhail F. Limonov, et al.; "Fano resonances in photonics"; Nature Photonics; Sep. 1, 2017; pp. 543-554; vol. 11; Macmillan Publishers Limited; Springer nature.

* cited by examiner

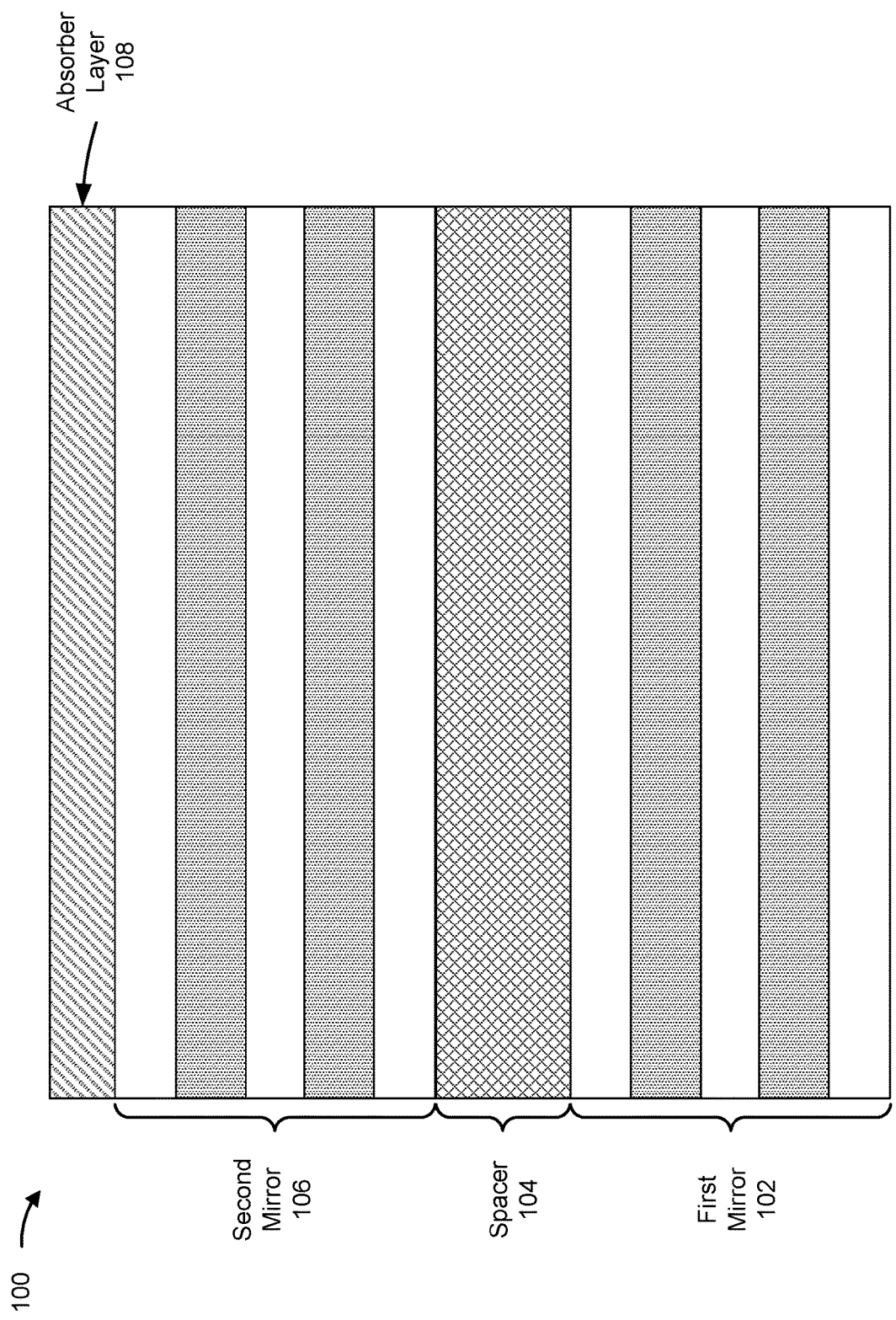

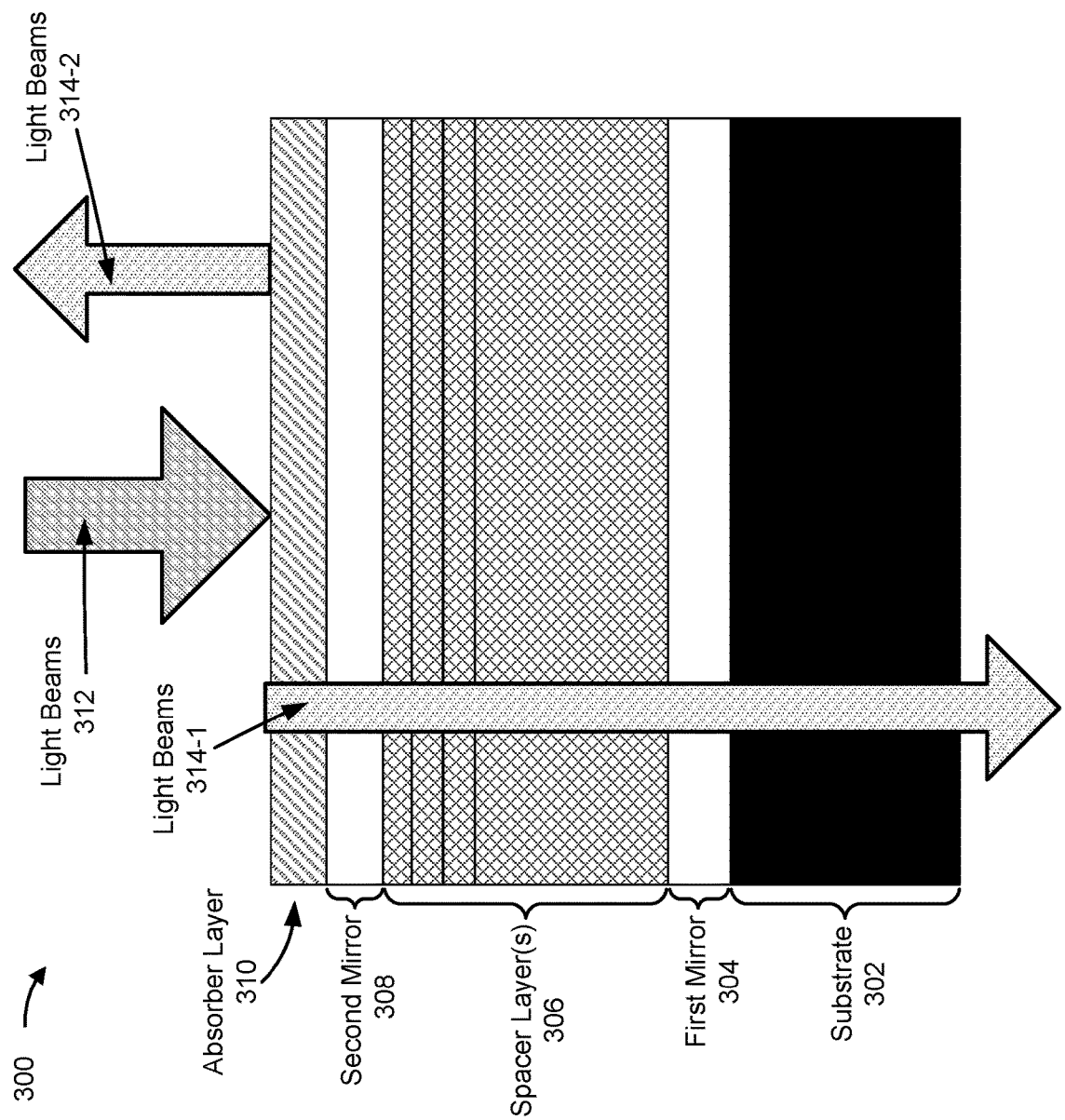

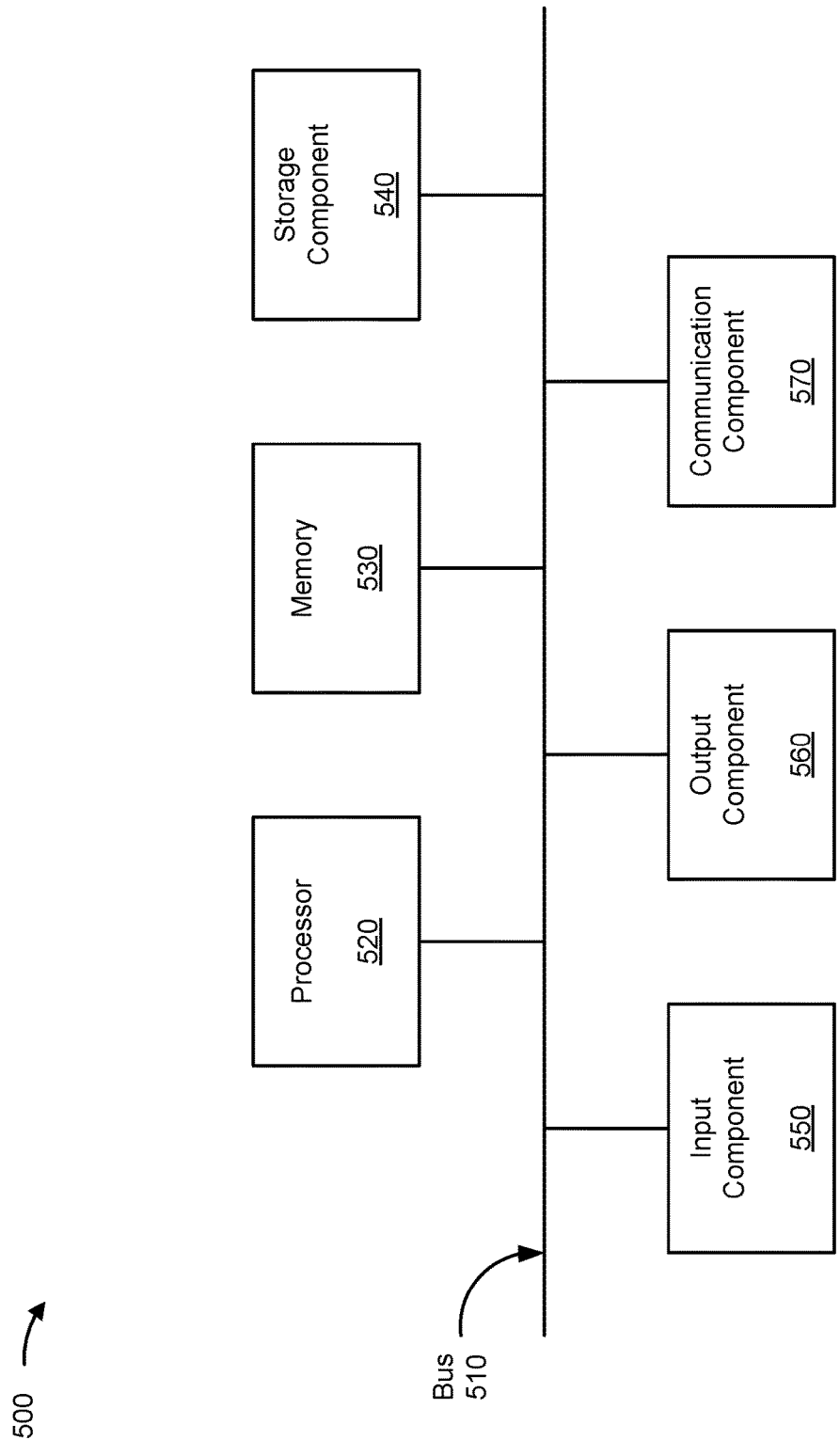

US 11,858,288 B2

FANO RESONANCE BASED OPTICAL COMPONENT OF A SECURITY ARTICLE

BACKGROUND

Some documents, such as monetary instruments, may include one or more security features to combat counterfeiting. For example, a surface of a document may include a coating of magnetic ink that includes magnetically aligned magnetic flakes to create an optical feature (e.g., a color-shifting feature or a reflectivity feature). As another example, the document may include an integrated circuitry (IC) chip that includes information associated with the document that can be read when the document contacts an IC chip reader.

SUMMARY

In some implementations, a security article comprising: an optical component that includes a plurality of optical channels with a Fano resonance characteristic, wherein: a number of optical channels, of the plurality of optical channels, is greater than or equal to a threshold number of optical channels, and an optical channel, of the plurality of optical channels, is configured to: pass a first portion of a first set of light beams when the first set of light beams falls incident on at least one of a first surface or a second surface of the optical channel, wherein the first set of light beams is associated with a first wavelength range; reflect a second portion of the first set of light beams when the first set of light beams falls incident on the first surface of the optical channel; and reflect at least a portion of a second set of light beams when the second set of light beams falls incident on the second surface of the optical channel, wherein the second set of light beams is associated with a second wavelength range.

In some implementations, a security article reader system includes a first light emission device configured to emit a first set of light beams toward a first surface of an optical component of a security article when the security article is placed within an interrogation area of the security article reader system; a second light emission device configured to emit a second set of light beams toward a second surface of the optical component of the security article when the security article is placed within the interrogation area of the security article reader system; and a plurality of sensor elements configured to generate sensor data associated with a plurality of optical channels included within the optical component of the security article when at least some of the first set of light beams or at least some of the second set of light beams are received by the plurality of sensor elements after being transmitted or being reflected by the plurality of optical channels.

In some implementations, a method includes identifying, by a security article reader system, sensor data associated with a plurality of optical channels included within an optical component of a security article; determining, by the security article reader system and based on the sensor data, one or more respective optical characteristics of the plurality of optical channels; determining, by the security article reader system and based on the one or more respective optical characteristics of the plurality of optical channels, identification information associated with the optical component; and causing, by the security article reader system, one or more actions to be performed based on the identification information associated with the optical component.

BRIEF DESCRIPTION OF THE DRAWINGS

FIGS. 1A-1B are diagrams of example configurations of an optical channel described herein.
FIGS. 3A-3B are diagrams of an overview of an example implementation related to an optical channel.
FIG. 5 is a diagram of example components of one or more devices of FIGS. 4A-4D.

DETAILED DESCRIPTION

Figure 1B:
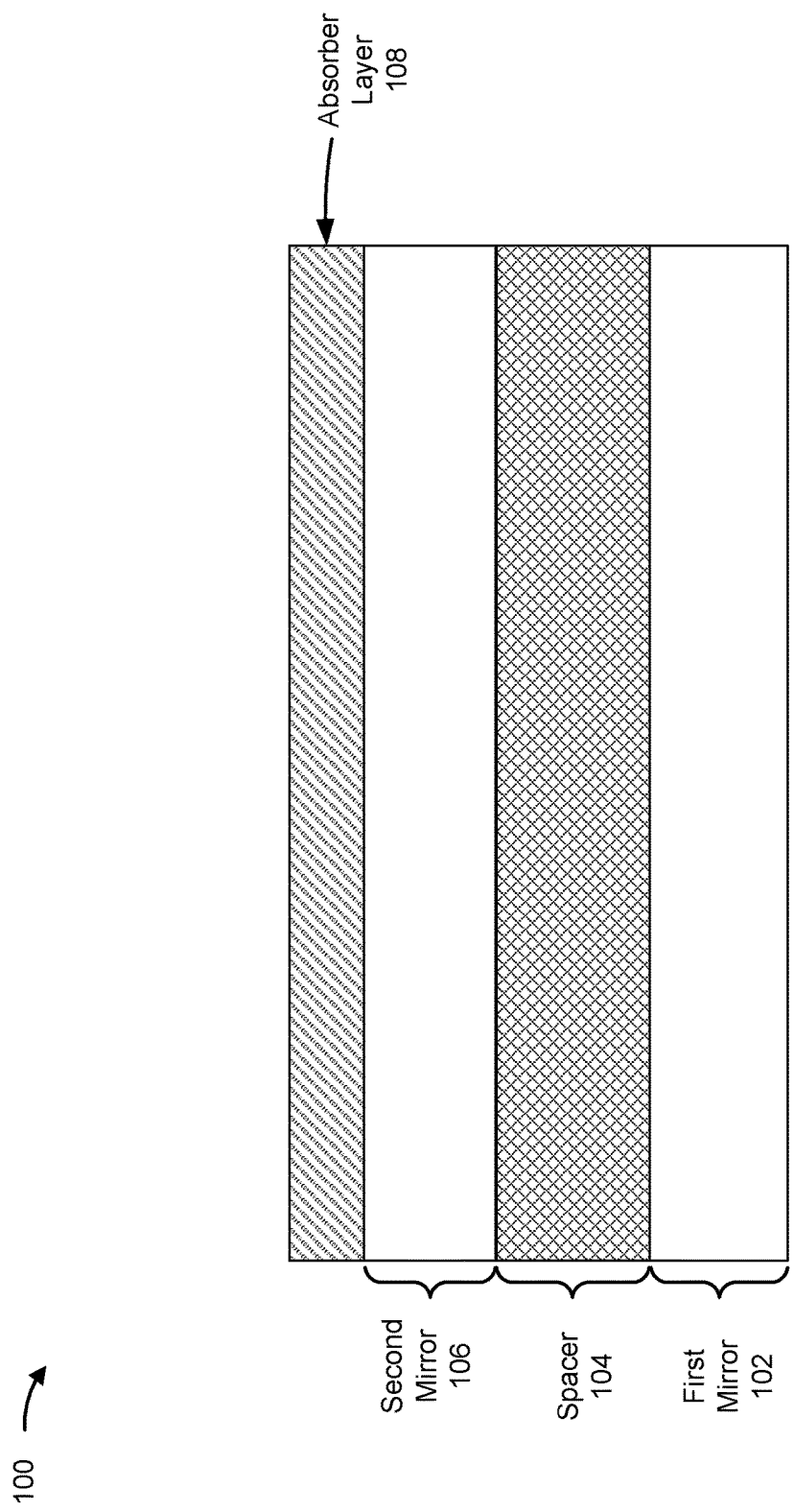

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

In some cases, a document, such as paper currency, may include one or more optical security features, such as a watermark or a pattern printed with color shifting ink, on a region of the document. A person may inspect, or may use a validation device, to analyze the document to determine that the one or more optical security features are present in the security article. Based on identifying the one or more optical security features, the person, or the validation device, may determine that the document is genuine. For example, a person may view a watermark in a dollar bill and may conclude that the dollar bill is not counterfeit. However, as advanced printing technology becomes more widely available (e.g., beyond government organizations or security-providing companies), an optical security feature may be able to be reproduced (or a facsimile optical feature that appears to be similar to the optical feature may be produced), which enables counterfeiting of the document and increases a likelihood that the counterfeit document is deemed legitimate.

Further, in some cases, a document, such as a transaction card, may include an integrated circuitry (IC) chip that includes information associated with the document. A person may use a chip reader transaction device that reads the IC chip (e.g., by applying current to the IC chip and capturing one or more electronic measurements associated with the IC chip) to determine authentication information included in the IC chip, which the chip reader transaction devices uses to validate the IC chip and the document. However, the interaction between the IC chip and the chip reader transaction device is subject to interception vulnerabilities (e.g., by card skimmer devices), which enables the IC chip to be reproduced in a counterfeit document and/or for authentication information included in the IC chip to be used in future fraudulent transactions.

Some implementations described herein provide a security article that includes an optical component with a plurality of optical channels. An optical channel, of the plurality of optical channels, may be configured to pass a first portion of a first set of light beams (that are associated with a first wavelength range) when the first set of light beams falls incident on at least one of a first surface or a second surface of the optical channel, reflect a second portion of the first set of light beams when the first set of light beams falls incident on the first surface of the optical channel, and reflect at least a portion of a second set of light beams (that are associated with a second wavelength range) when the second set of light beams falls incident on the second surface of the optical channel. In this way, the optical channel may have one or more optical characteristics, such as a reflection characteristic associated with the first side of the optical channel, a transmission characteristic associated with the optical channel, and/or a reflection characteristic associated with a second side of the optical channel. Accordingly, the optical component may be configured to include a plurality of optical channels with particular sets of optical characteristics that can be used to uniquely identify the optical component and/or the security article in which the optical component is included.

Some implementations described herein provide a security article reader system that may read the optical component of the security article. The security article reader system may include a first light emission device configured to emit a first set of light beams toward a first surface of the optical component of the security article (e.g., when the security article is placed within an interrogation area of the security article reader system) and a second light emission device configured to emit a second set of light beams toward a second surface of the optical component of the security article (e.g., when the security article is placed within the interrogation area of the security article reader system). The security article reader system may include a plurality of sensor elements configured to generate sensor data associated with the plurality of optical channels included within the optical component of the security article (e.g., when at least some of the first set of light beams or at least some of the second set of light beams are received by the plurality of sensor elements after being transmitted or being reflected by the plurality of optical channels). The security article reader system may include one or more or more processors that are configured to determine, based on the sensor data, one or more respective optical characteristics of the plurality of optical channels and thereby determine identification information associated with the optical component. The one or more processors then may validate (or invalidate) the optical component and/or security article based on the identification information.

In this way, some implementations allow for an optical component that can represent unique information based on the optical characteristics of the plurality of optical channels included in the optical component. The representation of the information by the optical component has an increased complexity as compared to a digital bit representation by a conventional IC chip, making duplication of a counterfeit optical component difficult. Further, using optical characteristics to represent information reduces a likelihood that a card skimmer device (or any other type of man-in-the-middle device) is able to read or replicate the information during a legitimate transaction without altering or obscuring the optical characteristics that are to be read by a security article reader system. In this way, a facsimile optical component is harder to produce, which reduces a likelihood of counterfeiting of the security article that includes the optical component. Accordingly, use of technical resources, such as computing resources (e.g., processing resources, memory resources, communication resources, and/or power resources, among other examples) to investigate counterfeiting, scan potentially counterfeit security articles, identify counterfeit security articles, and/or analyze security articles, among other examples may be reduced.

FIGS. 1A-1B are diagrams of example configurations of an optical channel 100 described herein. The optical channel 100 may be included in an optical component (e.g., optical component 202 described below in relation to FIGS. 2A-2C and/or optical component 404 described below in relation to FIGS. 4A-4D). As shown in FIGS. 1A-1B, the optical channel 100 may include a first mirror 102, a spacer 104, a second mirror 106, and/or an absorber layer 108. As shown in FIG. 1A, the first mirror 102 and/or the second mirror 106 may each include a dielectric mirror. For example, the first mirror 102 and/or the second mirror 106 may each include a set of alternating dielectric layers, such as an alternating set of hydrogenated silicon layers and silicon dioxide layers. Alternatively, as shown in FIG. 1B, the first mirror 102 and/or the second mirror 106 may each include a metallic mirror, such as a silver mirror.

As further shown in FIGS. 1A-1B, the spacer 104 be disposed between the first mirror 102 and the second mirror 106 (e.g., the spacer 104 may disposed on the first mirror 102 and the second mirror 106 may be disposed on the spacer 104). In some implementations, the spacer 104 may comprise one or more spacer layers (e.g., as described in more detail herein in relation to FIGS. 2B-2C). In some implementations, a thickness of the spacer 104 may be configured to provide a particular distance between the first mirror 102 and the second mirror 106 to cause the optical channel 100 to pass light associated with a particular wavelength range (e.g., to pass light that has a wavelength that is greater than or equal to a lower bound of the particular wavelength range and that is less than an upper bound of the particular wavelength range).

As further shown in FIGS. 1A-1B, the absorber layer 108 may be disposed on the second mirror 106 (e.g., a surface of the second mirror 106 that is opposite the surface of the second mirror 106 that is disposed on the spacer 104). For example, as shown in FIGS. 1A-1B, the absorber layer 108 may be disposed on a top surface of the second mirror 106. Accordingly, a surface (e.g., a top surface) of the optical channel 100 may include a surface (e.g., a top surface) of the absorber layer 108.

The absorber layer 108 may include a material comprising germanium, silicon, amorphous silicon, silicon-germanium, a metallic oxide, a telluride, a sulfide, an arsenide, a phosphide, and/or an antimonide, among other examples. In some implementations, a thickness of the absorber layer 108 may be configured to cause a portion of light that falls incident on the absorber layer 108 to be absorbed by the absorber layer 108 and another portion of the light to pass through the absorber layer 108. Additionally, or alternatively, the thickness of the absorber layer 108 may be configured to cause the optical channel 100 to have a Fano resonance characteristic. For example, when light that is associated with a particular wavelength range falls incident on the surface (e.g., the top surface) of the optical channel 100, the absorber layer 108 may have a particular thickness to cause the optical channel 100 to pass a first portion of the light (e.g. through the optical channel 100 from the top surface of the optical channel 100 to a bottom surface of the optical channel 100) and to reflect a second portion of the light (e.g., at the top surface of the of the optical channel 100). In a specific example, when visible light (e.g., red-green-blue (RGB) light) falls incident on the surface (e.g., the top surface) of the optical channel 100, the absorber layer 108 may have a particular thickness to cause the optical channel 100 to pass a first portion of green light included in the visible light (e.g. through the optical channel 100 from the top surface of the optical channel 100 to the bottom surface of the optical channel 100) and to reflect a second portion of the green light included in the visible light (e.g., at the top surface of the of the optical channel 100).

In some implementations, another surface of the optical channel 100 (e.g., that does not include a surface of the absorber layer 108) may reflect light associated with a one or more different wavelength ranges (e.g., that do not overlap with the particular wavelength range described above). For example, when broadband light that is associated with the particular wavelength range and the one or more different wavelength ranges falls incident on the other surface (e.g., the bottom surface) of the optical channel 100, the optical channel 100 may pass at least a portion of light associated with the particular wavelength range that is included in the broadband light (e.g. through the optical channel 100 from the bottom surface of the optical channel 100 to the top surface of the optical channel 100) and may reflect at least a portion of light associated with the one or more different wavelength ranges (e.g., at the bottom surface of the optical channel 100). In a specific example, when visible light falls incident on the other surface (e.g., the bottom surface) of the optical channel 100, the optical channel 100 may pass at least a portion of green light included in the visible light (e.g. through the optical channel 100 from the bottom surface of the optical channel 100 to the top surface of the optical channel 100) and may reflect at least a portion of purple light (e.g., a mixture of red light and blue light) included in the visible light (e.g., at the bottom surface of the of the optical channel 100).

As indicated above, FIGS. 1A-1B are provided as examples. Other examples may differ from what is described with regard to FIGS. 1A-1B.

Figure 2A:
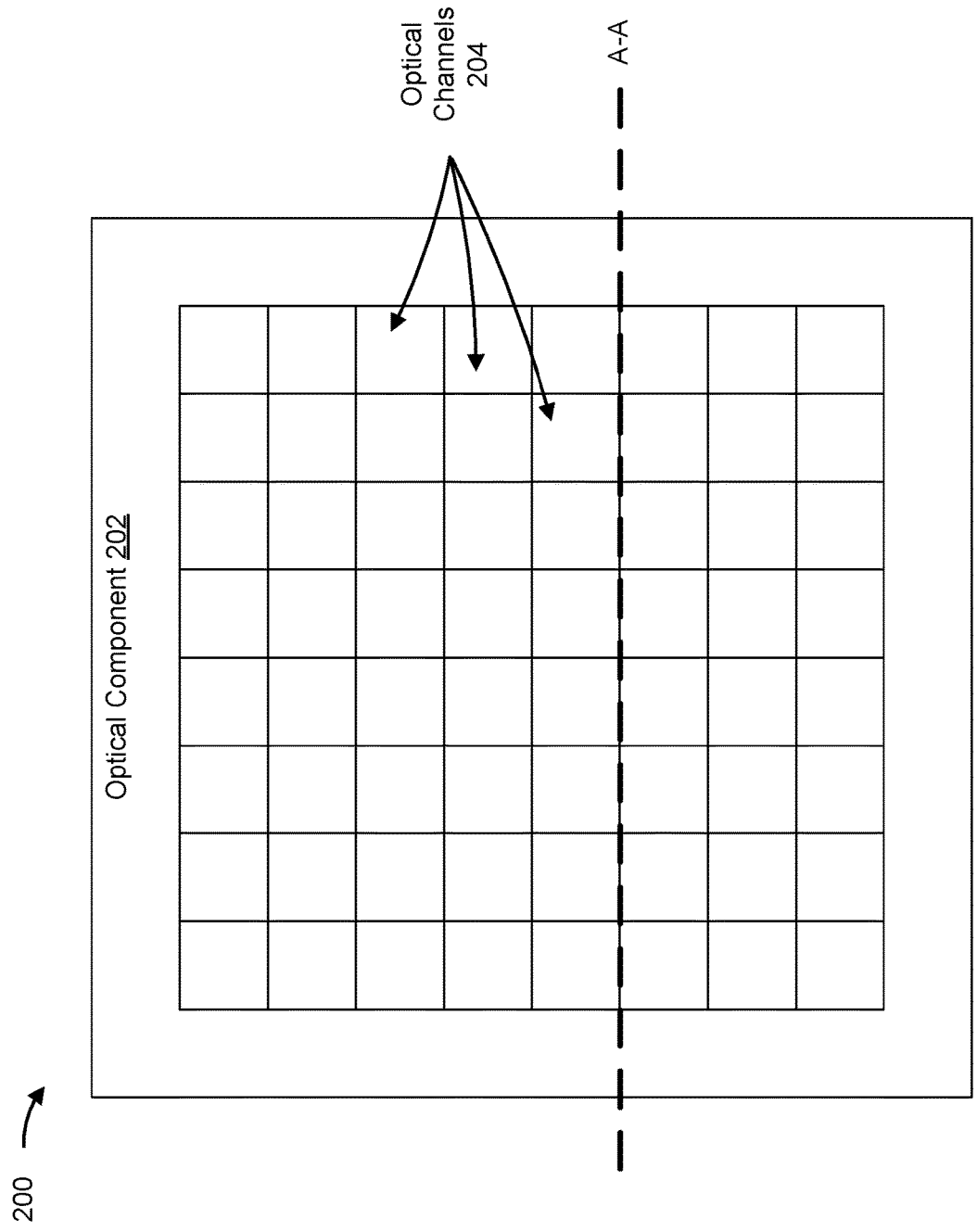
FIGS. 2A-2C are diagrams of an overview of an example implementation described herein.
Figure 2B:
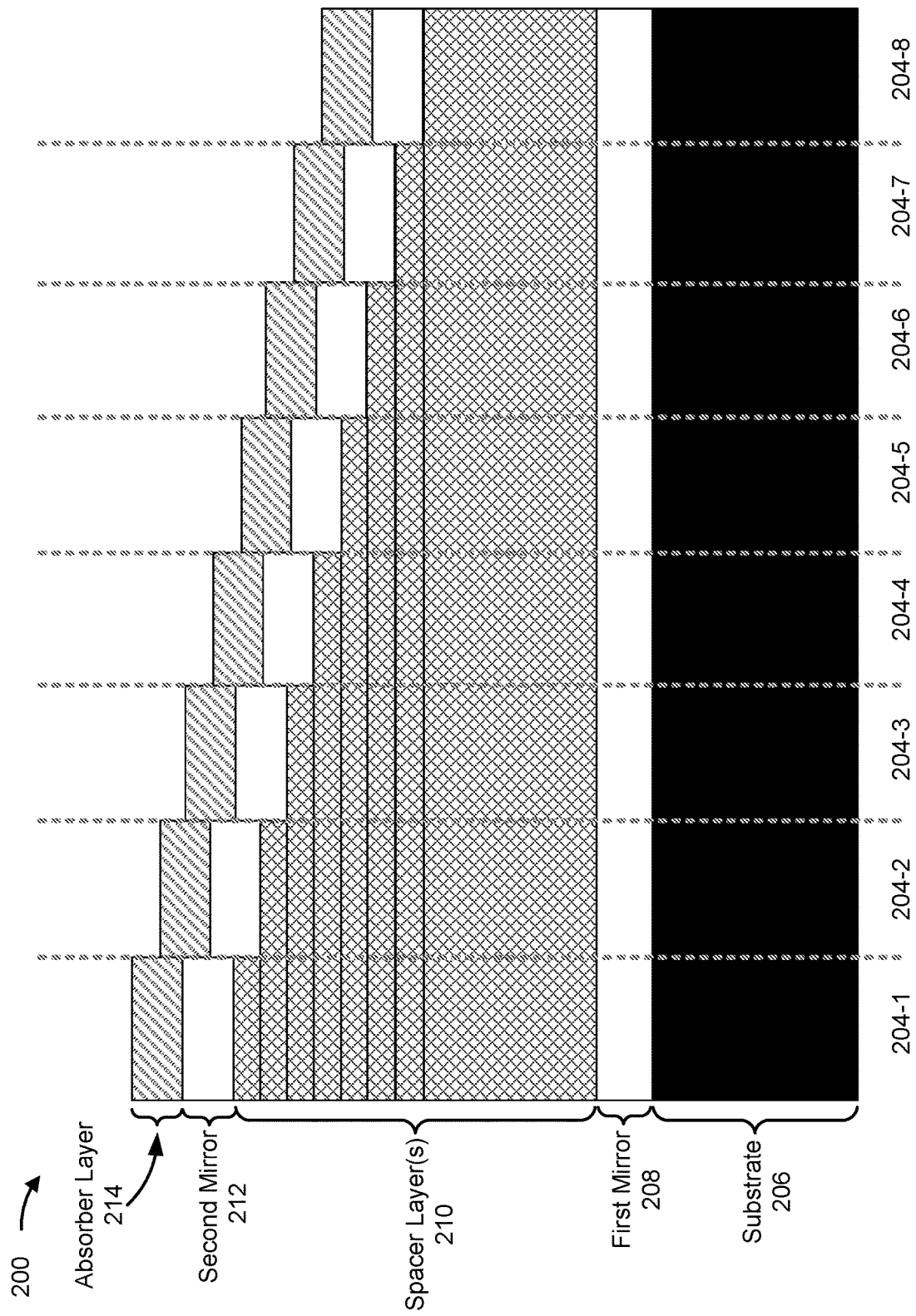
Figure 2C:
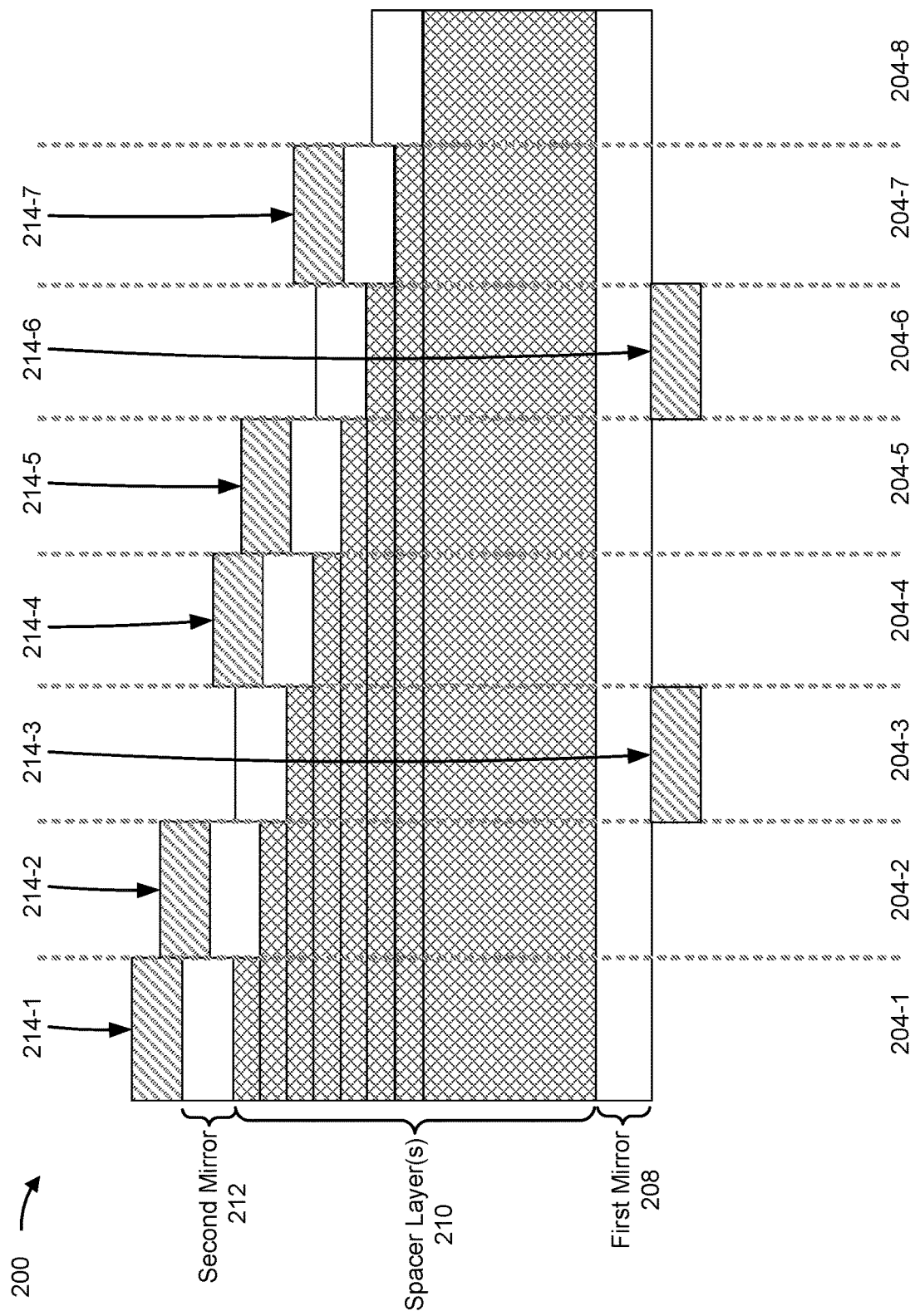

FIGS. 2A-2C are diagrams of an overview of an example implementation 200 described herein. As shown in FIG. 2A, example implementation 200 may include an optical component 202 that includes a plurality of optical channels 204 (e.g., arranged in a two dimensional array). FIG. 2A shows a top-down view of the optical component 202. In some implementations, the optical component 202 may be included in a security article (e.g., security article 402 described herein in relation to FIGS. 4A-4D). In some implementations, as further described herein, each optical channel 204 has a same or similar configuration as the optical channel 100 described herein in relation to FIGS. 1A-1B.

In some implementations, some or all of the plurality of optical channels 204 may have a Fano resonance characteristic (e.g., as described herein). Further, the number of optical channels 204, of the plurality of optical channels 204, that have a Fano resonance characteristic may be greater than or equal to a threshold number of optical channels. The threshold number may be greater than or equal to, for example, 5, 10, 16, 32, 64, or 128.

FIG. 2B shows an example cross-sectional, side view of the optical component 202 along the line A-A shown in FIG. 2A. As shown in FIG. 2B, a set of optical channels 204 (shown as optical channels 204-1 through 204-8) may be arranged in a row (or column) adjacent to each other. Each optical channel 204, of the set of optical channels 204, may include a substrate 206 (e.g., a glass substrate, or other light transmissive material, on which other layers described herein are grown, deposited, or otherwise formed), a first mirror 208 (e.g., that is the same as, or similar to, the first mirror 102 described herein in relation to FIGS. 1A-1B), a set of spacer layers 210 (e.g., that is the same as, or similar to, the spacer 104 described herein in relation to FIGS. 1A-1B), a second mirror 212 (e.g., that is the same as, or similar to, the second mirror 106 described herein in relation to FIGS. 1A-1B), and/or an absorber layer 214 (e.g., that is the same as, or similar to, the absorber layer 108 described herein in relation to FIGS. 1A-1B). As further shown in FIG. 2B, the first mirror 208 may be disposed on the substrate 206, the set of spacer layers 210 may be disposed on the first mirror 208, the second mirror 212 may be disposed on the set of spacer layers 210, and/or the absorber layer 214 may be disposed on the second mirror 212. Accordingly a surface of the absorber layer 214 (e.g., a top surface of the absorber layer 214 as shown in FIG. 2B) may be included in a surface of the optical channel 204 (e.g., a top surface of the optical channel 204 as shown in FIG. 2B). The surface of the optical channel 204 (e.g., the top surface of the optical channel 204) may be included in a surface of the optical component 202 (e.g., a top surface of the optical component 202).

In some implementations, each optical channel 204, of the set of optical channels 204, may include a different number of spacer layers 210. Accordingly, a thickness of the set of spacer layers 210 for each optical channel 204 may be different, which may cause each optical channel 204 to be configured to pass light associated with a particular wavelength range (e.g., to pass light that has a wavelength that is greater than or equal to a lower bound of the particular wavelength range and that is less than an upper bound of the particular wavelength range). For example, as shown in FIG. 2B, the optical channel 204-1 includes a set of spacer layers 210 that includes eight spacer layers 210, which causes the optical channel 204-1 to pass light associated with a first wavelength range; the optical channel 204-2 includes a set of spacer layers 210 that includes seven spacer layers 210, which causes the optical channel 204-2 to pass light associated with a second wavelength range; the optical channel 204-3 includes a set of spacer layers 210 that includes six spacer layers 210 that causes the optical channel 204-3 to pass light associated with a third wavelength range; and so on.

In some implementations, a thickness of an absorber layer 214 of an optical channel 204, of the set of optical channels 204, may match (e.g., may be the same as, within a thickness tolerance, such as 2 nanometers) a thickness of an absorber layer 214 of at least one other optical channel 204 of the set of optical channels 204. For example a thickness of the absorber layer 214 of the optical channel 204-1 may match a thickness of the absorber layer 214 of the optical channel 204-2. In some implementations, a thickness of an absorber layer 214 of an optical channel 204 may be associated with a particular wavelength range of light that the optical channel 204 is configured to pass. Accordingly, each absorber layer 214 of the set of optical channels 204 may have a different thickness than that of other optical channels 204 of the set of optical channels 204. For example, a difference between a thickness of an absorber layer 214 of the optical channel 204-3 and a thickness of an absorber layer 214 of the optical channel 204-4 may satisfy (e.g., may be greater than) a thickness difference threshold, such as 2 nanometers.

In some implementations, each optical channel 204, of the set of optical channels 204, may have a Fano resonance characteristic (e.g., due to the absorber layer 214 being disposed on the second mirror 212 and/or a surface of the absorber layer 214 being included in a surface of the optical channel 204). For example, each optical channel 204, of the set of optical channels 204, may be configured to pass first light beams associated with a particular wavelength range when the first light beams fall incident on a first surface or a second surface (e.g., a top surface or a bottom surface) of the optical channel 204, to reflect second light beams associated with the particular wavelength range when the second light beams fall incident on the first surface (e.g., the top surface) of the optical channel 204, and/or to reflect third light beams associated with a different wavelength range when the third light beams fall incident on the second surface (e.g., the bottom surface) of the optical channel 204.

In an additional example, the optical channel 204-1 may be configured to receive (e.g., on a top surface and/or a bottom surface of the optical channel 204-1) broadband light that includes a first set of light beams associated with a first wavelength range and a second set of light beams associated with a second wavelength range. The optical channel 204-1 may be configured to pass a first portion of the first set of light beams (e.g., through the optical channel 204-1) when the first set of light beams falls incident on at least one of the top surface or the bottom surface of the optical channel 204-1, to reflect a second portion of the first set of light beams (e.g., at the top surface of the optical channel 204-1) when the first set of light beams falls incident on the top surface of the optical channel 204-1, and/or to reflect at least a portion of the second set of light beams (e.g., at the bottom surface of the optical channel 204-1) when the second set of light beams falls incident on the bottom surface of the optical channel 204-1. Additionally, or alternatively, the optical channel 204-1 may be configured to prevent the second set of light beams from passing through the optical channel 204-1 (e.g., may be configured to block the second set of light beams) when the second set of light beams falls incident on at least one of the top surface or the bottom surface of the optical channel 204-1.

As another example, the optical channel 204-2 may be configured to receive (e.g., on a top surface and/or a bottom surface of the optical channel 204-2) broadband light that includes a third set of light beams associated with a third wavelength range and a fourth set of light beams associated with a fourth wavelength range. The optical channel 204-2 may be configured to pass a first portion of the third set of light beams (e.g., through the optical channel 204-2) when the third set of light beams falls incident on at least one of the top surface or the bottom surface of the optical channel 204-2, to reflect a second portion of the third set of light beams (e.g., at the top surface of the optical channel 204-2) when the third set of light beams falls incident on the top surface of the optical channel 204-2, and/or to reflect at least a portion of the fourth set of light beams (e.g., at the bottom surface of the optical channel 204-2) when the fourth set of light beams falls incident on the bottom surface of the optical channel 204-2. Additionally, or alternatively, the optical channel 204-2 may be configured to prevent the fourth set of light beams from passing through the optical channel 204-2 (e.g., may be configured to block the fourth set of light beams) when the fourth set of light beams falls incident on at least one of the top surface or the bottom surface of the optical channel 204-2.

FIG. 2C shows another example cross-sectional, side view of the optical component 202 along the line A-A shown in FIG. 2A. As shown in FIG. 2C, a set of optical channels 204 (shown as optical channels 204-1 through 204-8) may be arranged in a row (or column) adjacent to each other. Each optical channel 204, of the set of optical channels 204, may include a first mirror 208, a set of spacer layers 210, a second mirror 212, and/or an absorber layer 214. As further shown in FIG. 2C, the set of optical channels 204 may include a first subset of optical channels 204 (e.g., that includes optical channels 204-1, 204-2, 204-4, 204-5, and 204-7), a second subset of optical channels 204 (e.g., that includes optical channels 204-3 and 204-6), and/or a third subset of optical channels 204 (e.g., that includes optical channel 204-8).

For an optical channel 204 of the first subset of optical channels 204 (e.g., that includes optical channels 204-1, 204-2, 204-4, 204-5, and 204-7), the set of spacer layers 210 may be disposed on the first mirror 208, the second mirror 212 may be disposed on the set of spacer layers 210, and/or the absorber layer 214 (e.g., absorber layer 214-1, 214-2, 214-4, 214-5, or 214-7) may be disposed on the second mirror 212 (e.g., in a similar manner as that described above in relation to FIG. 2B). Accordingly a surface of the absorber layer 214 (e.g., a top surface of the absorber layer 214 as shown in FIG. 2C) may be included in a first surface of the optical channel 204 (e.g., a top surface of the optical channel 204 as shown in FIG. 2C) and the first surface of the optical channel 204 (e.g., the top surface of the optical channel 204) may be included in a first surface of the optical component 202 (e.g., a top surface of the optical component 202).

In this way, each optical channel 204, of the first subset of optical channels 204, may have a Fano resonance characteristic (e.g., due to the absorber layer 214 being disposed on the second mirror 212 and/or the surface of the absorber layer 214 being included in the first surface of the optical channel 204). For example, each optical channel 204, of the first subset of optical channels 204, may be configured to pass first light beams associated with a particular wavelength range when the first light beams fall incident on the first surface or the second surface (e.g., a top surface or a bottom surface) of the optical channel 204, to reflect second light beams associated with the particular wavelength range when the second light beams fall incident on the first surface (e.g., the top surface) of the optical channel 204, and/or to reflect third light beams associated with a different wavelength range when the third light beams fall incident on the second surface (e.g., the bottom surface) of the optical channel 204.

For an optical channel 204 of the second subset of optical channels 204 (e.g., that includes optical channels 204-3 and 204-6), the first mirror 208 may be disposed on the absorber layer 214 (e.g., absorber layer 214-3 or 214-6), the set of spacer layers 210 may be disposed on the first mirror 208, and/or the second mirror 212 may be disposed on the set of spacer layers 210. In this way, the second subset of optical channels 204 may have a different orientation (e.g., an opposite orientation) than that of the first subset of optical channels 204. Accordingly a surface of the absorber layer 214 (e.g., a bottom surface of the absorber layer 214 as shown in FIG. 2C) may be included in a first surface of the optical channel 204 (e.g., a bottom surface of the optical channel 204 as shown in FIG. 2C) and the first surface of the optical channel 204 (e.g., the bottom surface of the optical channel 204) may be included in a second surface of the optical component 202 (e.g., the bottom surface of the optical component 202).

In this way, each optical channel 204, of the second subset of optical channels 204, may have a Fano resonance characteristic (e.g., due to the absorber layer 214 being disposed on the first mirror 208 and/or the surface of the absorber layer 214 being included in the first surface of the optical channel 204). For example, each optical channel 204, of the second subset of optical channels 204, may be configured to pass first light beams associated with a particular wavelength range when the first light beams fall incident on the first surface or the second surface (e.g., a bottom surface or a top surface) of the optical channel 204, to reflect second light beams associated with the particular wavelength range when the second light beams fall incident on the first surface (e.g., the bottom surface) of the optical channel 204, and/or to reflect third light beams associated with a different wavelength range when the third light beams fall incident on the second surface (e.g., the top surface) of the optical channel 204.

For an optical channel 204, of the third subset of optical channels 204 (e.g., that includes optical channel 204-8), the set of spacer layers 210 may be disposed on the first mirror 208, and/or the second mirror 212 may be disposed on the set of spacer layers 210 and the optical channel 204 may not include an absorber layer 214. In this way, each optical channel 204, of the third subset of optical channels 204, may not have a Fano resonance characteristic (e.g., due to an absence of an absorber layer 214). For example, each optical channel 204, of the third subset of optical channels 204, may be configured to pass first light beams associated with a particular wavelength range when the first light beams fall incident on a first surface or a second surface (e.g., a top surface or a bottom surface) of the optical channel 204, to reflect second light beams associated with a different range when the second light beams fall incident on the first surface (e.g., the top surface) of the optical channel 204, and/or to reflect third light beams associated with the different wavelength range when the third light beams fall incident on the second surface (e.g., the bottom surface) of the optical channel 204.

As indicated above, FIGS. 2A-2C are provided as examples. Other examples may differ from what is described with regard to FIGS. 2A-2C.

Figure 3B:
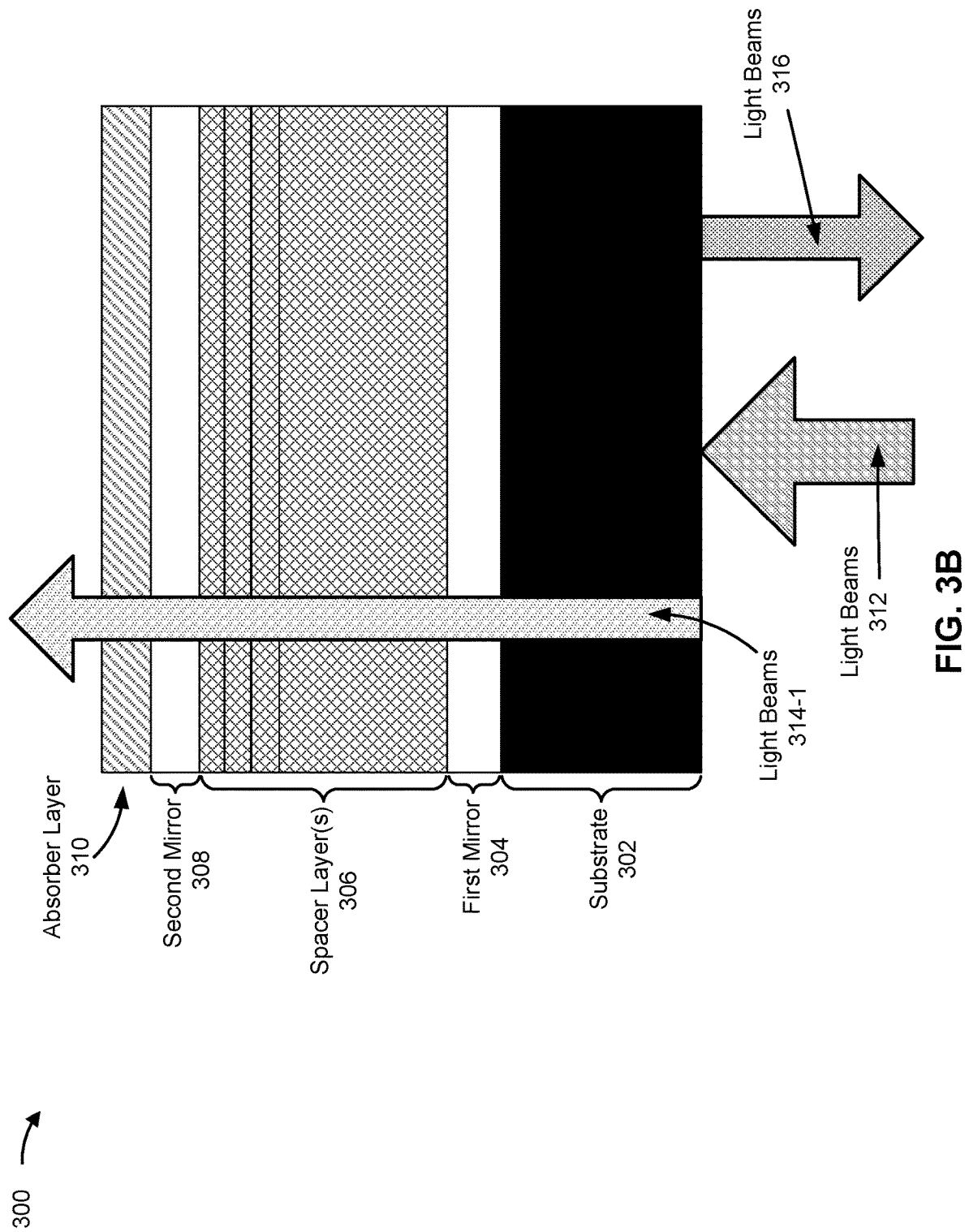

FIGS. 3A-3B are diagrams of an overview of an example implementation related to an optical channel 300 (e.g., that corresponds to an optical channel 100 described herein in relation to FIGS. 1A-1B and/or the optical channel 204 described herein in relation to FIGS. 2A-2C). As shown in FIGS. 3A-3B, the optical channel 300 may include a substrate 302 (e.g., that is the same as, or similar to, the substrate 206 described herein in relation to FIG. 2B), a first mirror 304 (e.g., that is the same as, or similar to, the first mirror 102 described herein in relation to FIGS. 1A-1B and/or the first mirror 208 described herein in relation to FIGS. 2B-2C), a set of spacer layers 306 (e.g., that is the same as, or similar to, the spacer 104 described herein in relation to FIGS. 1A-1B and/or the set of spacer layers 210 described herein in relation to FIGS. 2B-2C), a second mirror 308 (e.g., that is the same as, or similar to, the second mirror 106 described herein in relation to FIGS. 1A-1B and/or the second mirror 212 described herein in relation to FIGS. 2B-2C), and/or an absorber layer 310 (e.g., that is the same as, or similar to, the absorber layer 108 described herein in relation to FIGS. 1A-1B and/or the absorber layer 214 described herein in relation to FIGS. 2B-2C).

As shown in FIG. 3A, a set of broadband light beams 312 may fall incident on a first surface (e.g., a top surface) of the optical channel 300. The set of broadband light beams 312 may include a first set of light beams 314 that are associated with a first wavelength range and a second set of light beams 316 that are associated with a second wavelength range. The optical channel 100 may be configured to pass light associated with the first wavelength range. Accordingly, the optical channel 100 may pass a first portion of the first set of light beams 314-1 through the optical channel 300 from the first surface (e.g., the top surface) to a second surface (e.g., a bottom surface) of the optical channel 300. Further, the optical channel 300 may have a Fano resonance characteristic (e.g., due to the absorber layer 310 being disposed on the second mirror 308 and/or a surface of the absorber layer 310 being included in the first surface of the optical channel 300). Accordingly, the optical channel 300 may reflect (e.g., at the first surface of the optical channel 300) a second portion of the first set of light beams 314-2.

As shown in FIG. 3B, the set of broadband light beams 312 may fall incident on the second surface (e.g., the bottom surface) of the optical channel 300. Accordingly, because the optical channel 100 may be configured to pass light associated with the first wavelength range, the optical channel 100 may pass the first portion of the first set of light beams 314-1 through the optical channel 300 from the second surface (e.g., the bottom surface) to the first surface (e.g., the top surface) of the optical channel 300. Further, because the absorber layer 310 is disposed on the second mirror 308 and not on the first mirror 304 and/or the absorber layer 310 is included in the first surface (e.g., the top surface) of the optical channel 300 and not in the second surface (e.g., the bottom surface) of the optical channel 300, the optical channel 300 may not exhibit the Fano resonance characteristic for light beams that fall incident on the second surface (e.g., the bottom surface) of the optical channel 300. Accordingly, the optical channel 300 may reflect (e.g., at the second surface of the optical channel 300) at least a portion of the second set of light beams 316.

As indicated above, FIGS. 3A-3B are provided as examples. Other examples may differ from what is described with regard to FIGS. 3A-3B.

Figure 4A:
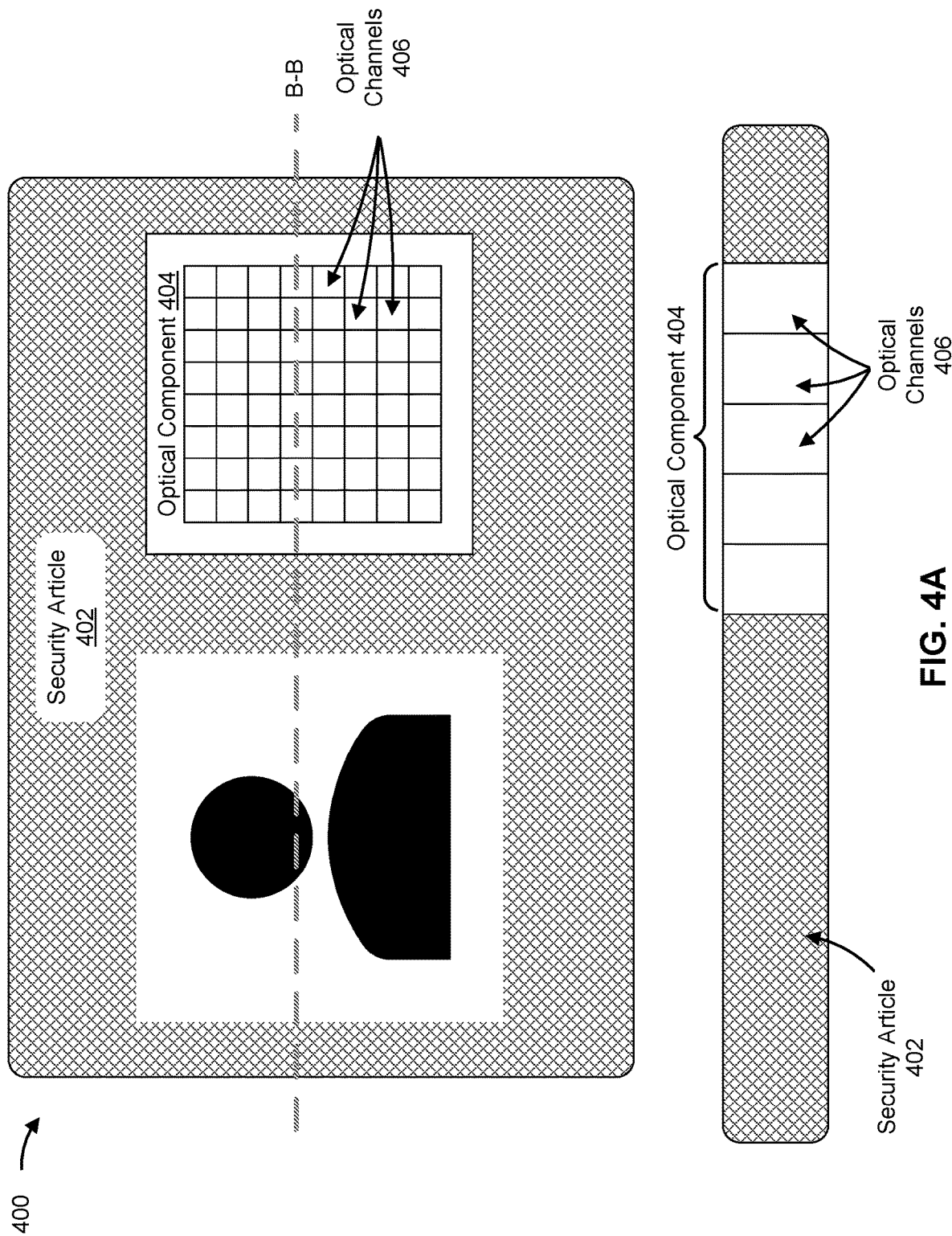
FIGS. 4A-4D are diagrams of an overview of an example implementation described herein.

FIGS. 4A-4D are diagrams of an overview of an example implementation 400 described herein. As shown in FIG. 4A, example implementation 400 may include a security article 402 that includes an optical component 404 (e.g., that is the same as or similar to the optical component 202 described herein in relation to FIGS. 2A-2C), which may include a plurality of optical channels 406 (e.g., that correspond to the optical channel 100, the optical channel 204, and/or the optical channel 300 described herein in relation to FIGS. 1A-1B, 2A-2C, and 3A-3B). In some implementations, the security article 402 may include currency, a bank note, a government issued identification card, a private organization identification card, or a transaction card, among other examples.

As shown in a top portion of FIG. 4A (e.g., that depicts the security article 402 as an identification card), the optical component 404 may be located within a region of the security article 402 and each optical channel 406, of the plurality of optical channels 406 included in the optical component 404, may be located within a respective subregion of the region of the security article 402. As shown in a bottom portion of FIG. 1A (e.g., that depicts a cross-sectional, side view of the security article 402 along the line B-B shown in the top portion of FIG. 4A), a set of optical channels 406 may be arranged adjacent to each other in a row (or column) (e.g., in a similar manner as the set of optical channels 204 described herein in relation FIGS. 2B-2C). As further shown in FIG. 4A, a first surface (e.g., a top surface) of an optical channel 406 may be included in a first surface (e.g., a top surface) of the optical component 404, which may be included in a first surface (e.g., a top surface) of the security article 402. Additionally, or alternatively, a second surface (e.g., a bottom surface) of an optical channel 406 may be included in a second surface (e.g., a bottom surface) of the optical component 404, which may be included in a second surface (e.g., a bottom surface) of the security article 402.

Figure 4B:
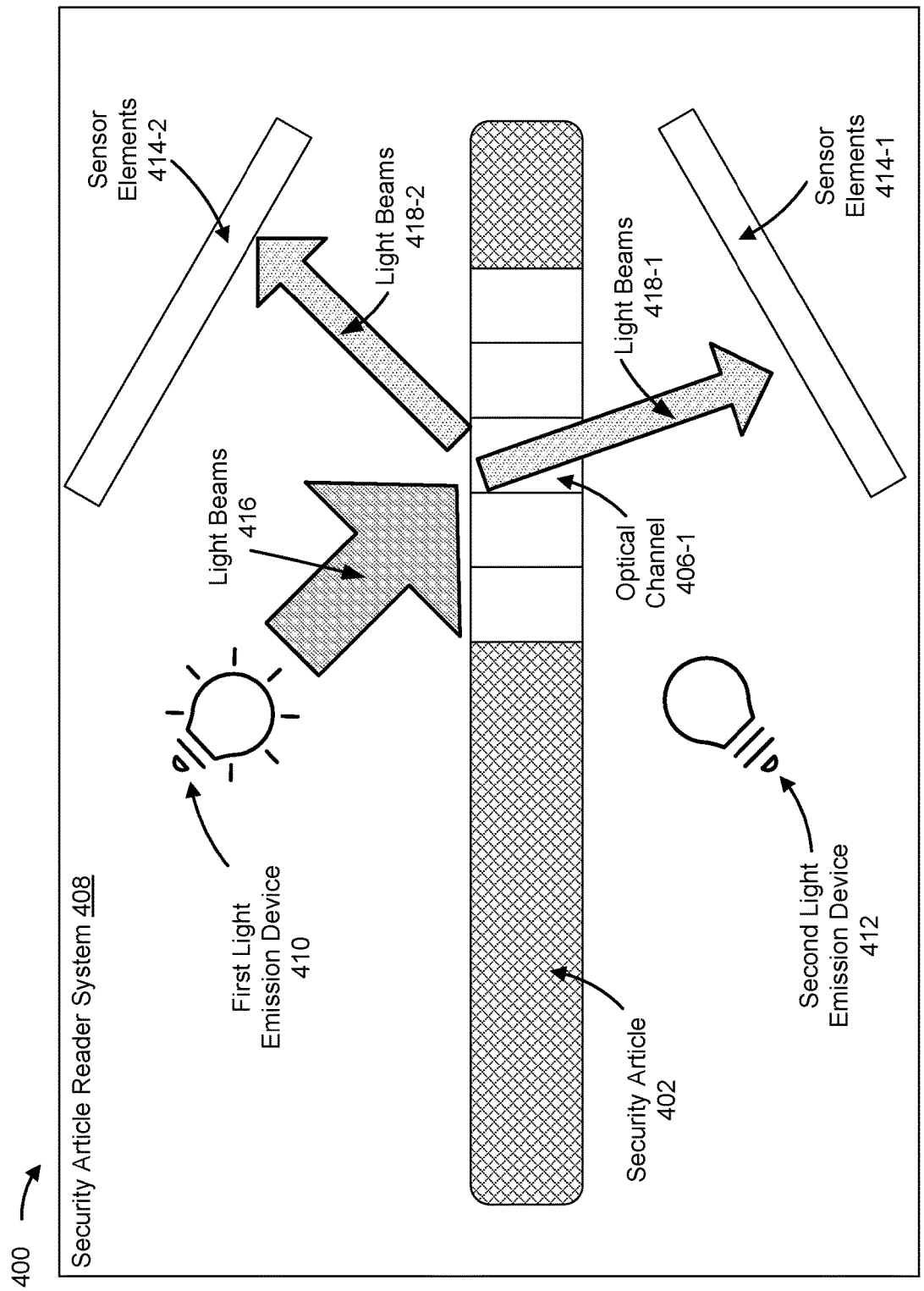
Figure 4C:
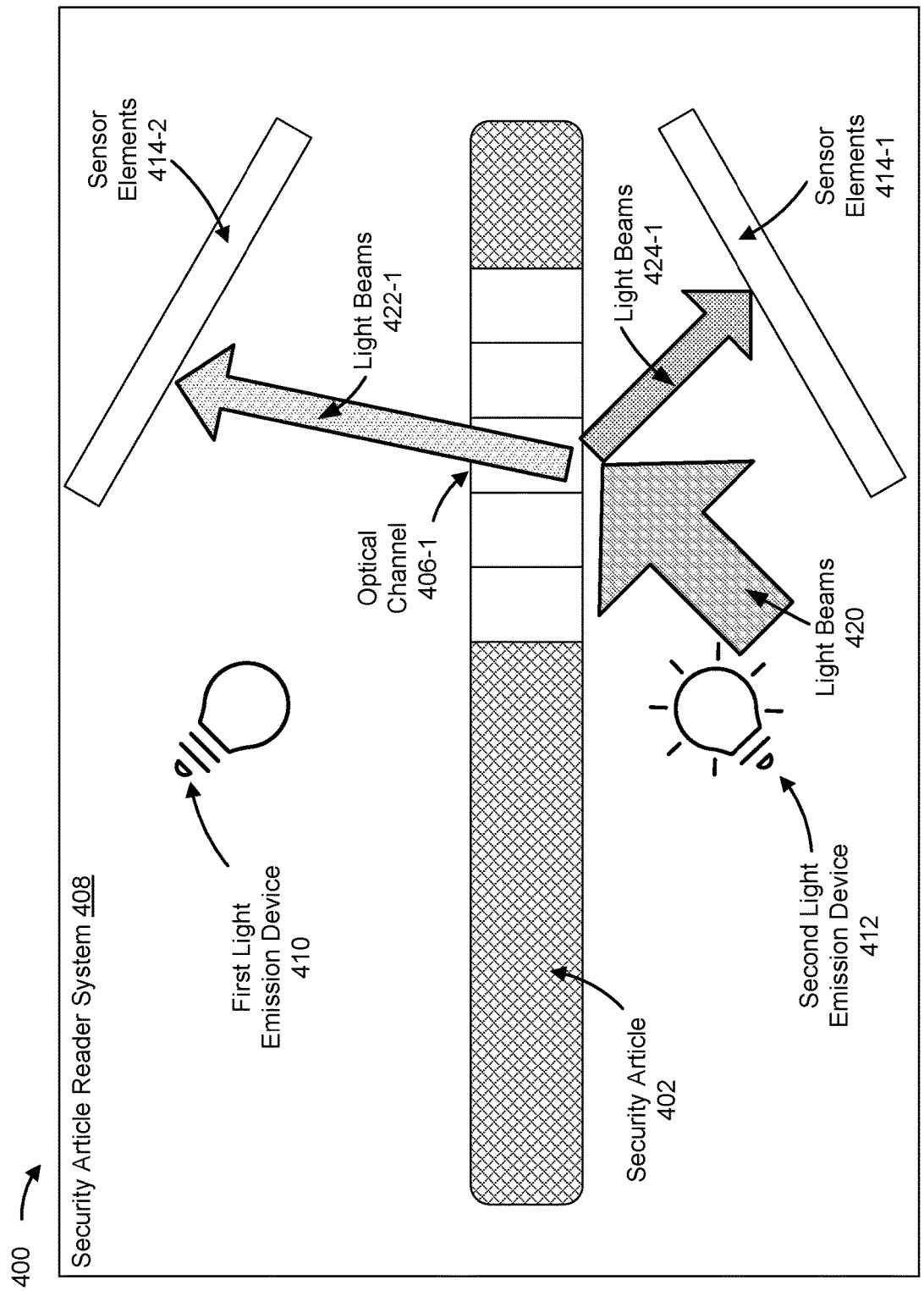
Figure 4D:
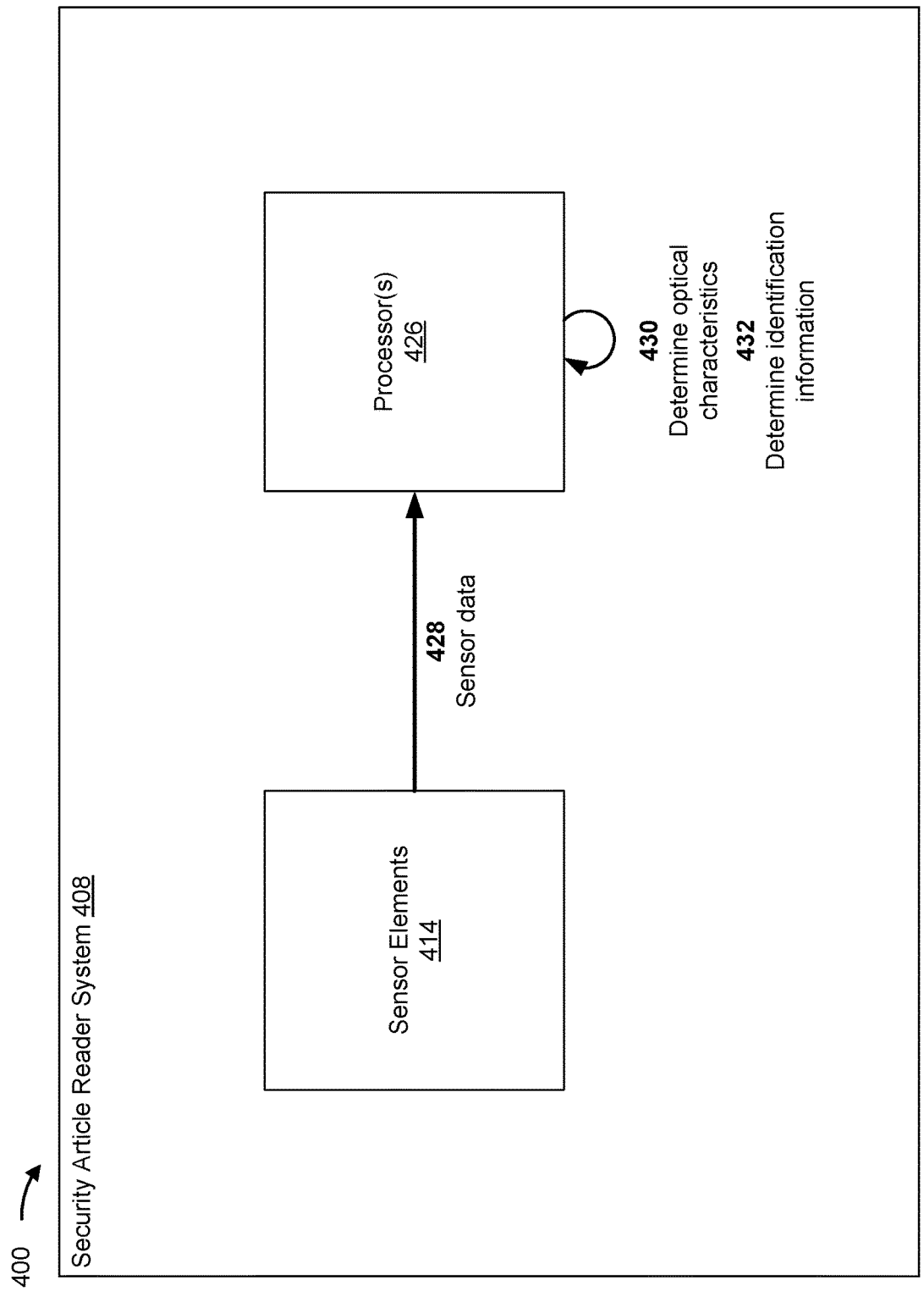

FIGS. 4B-4D show a security article reader system 408 that is configured to receive the security article 402 and to read the security article 402 to determine information related to the security article 402. For example, the security article reader system 408 may include an interrogation area (e.g., an internal portion of the security article reader system 408) in which the security article 402 may be placed to allow the security article reader system 408 to read the security article 402 (e.g., by optically interrogating the optical component 404, as further described herein). As shown in FIGS. 4B-4C, the security article reader system 408 may include a first light emission device 410, a second light emission device 412, and/or a plurality of sensor elements 414 (e.g., shown as a first set of sensor elements 414-1 and a second set of sensor elements 414-2).

The first light emission device 410 and/or the second light emission device 412 may each include, for example, a halogen light, an incandescent light, a compact fluorescent (CFL) light, a laser, a light emitting diode (LED), a florescent light, a neon light, and/or arrays of any of the preceding light emission devices. The first light emission device 410 and/or the second light emission device 412 may each be configured to provide light associated with a wavelength particular range (e.g., that is associated with a visible light range, an infrared light range, and/or an ultraviolet light range, among other examples). For example, at least one of the first light emission device 410 and/or the second light emission device 412 may provide light in a range of 700 nanometers to 1100 nanometers, which may enable sensing (e.g., by the plurality of sensor elements 414) based on light in the near-infrared (NIR) range. As another example, at least one of the first light emission device 410 and/or the second light emission device 412 may provide light in a broad range, such as a range of 300 nanometers to 2000 nanometers, which may enable sensing (e.g., by the plurality of sensor elements 414) based on broad spectrum light.

The plurality of sensor elements 414 may provide information related to light that falls incident on the plurality of sensor elements 414. For example, an individual sensor element 414, of the plurality of sensor elements 414, may provide an indication of intensity of light that is incident on the sensor element 414 (e.g., active/inactive or a more granular indication of intensity). As another example, the sensor element 414 may provide an indication of a wavelength or wavelength range of light that is incident on the sensor element 414 (e.g., red light, blue light, green light, ultraviolet light, and/or infrared light, among other examples). The plurality of sensor elements 414 may be configured to collect respective information from individual sensor elements 414, of the plurality of sensor elements 414, to generate sensor data.

In some implementations, one or more optical filters (not shown in FIGS. 4B-4C) may be disposed over the plurality of sensor elements 414 (e.g., a first individual optical filter may be disposed over the first set of sensor elements 414-1 and a second individual optical filter may be disposed over the second set of sensor elements 414-2). An optical filter, of the one or more optical filters, may include a spectral filter, a multispectral filter, an optical interference filter, a band-pass filter, a blocking filter, a long-wave pass filter, a short-wave pass filter, a dichroic filter, a linear variable filter (LVF), a circular variable filter (CVF), a Fabry-Perot filter (e.g., a Fabry-Perot cavity filter), a Bayer filter, a plasmonic filter, a photonic crystal filter, a nanostructure and/or metamaterial filter, an absorbent filter (e.g., comprising organic dyes, polymers, glasses, and/or the like), and/or the like.

In some implementations, the first light emission device 410 may be configured to emit a set of light beams 416 toward the first surface (e.g., the top surface) of the security article 402 when the security article 402 is placed within the interrogation area of the security article reader system 408. The set of light beams 416 may include light beams associated with a broadband wavelength range (e.g., visible light, ultraviolet light, and/or infrared light) or, in some implementations, may include light beams associated with one or more particular wavelength ranges. For example, the set of light beams 416 may include a first set of light beams 418 that are associated with a first wavelength range and/or other sets of light beams associated with other wavelength ranges. As shown in FIG. 4B, the first light emission device 410 may be configured to emit the set of light beams 416 toward the first surface of the optical component 404 that is included in the security article 402.

As further shown in FIG. 4B, at least some of the set of light beams 416 may be transmitted to a first surface of an optical channel 406-1 (e.g., that corresponds to the optical channel 100, the optical channel 204, and/or the optical channel 300 described herein in relation to FIGS. 1A-1B, 2A-2C, and 3A-3B), of the plurality of optical channels 406. The optical channel 406-1 may be configured to pass light associated with a first wavelength range (e.g., that is included in the broadband wavelength range associated with the set of light beams 416). Accordingly, the optical channel 406-1 may pass a first portion of the first set of light beams 418-1 (e.g., that is associated with the first wavelength range) through the optical channel 406-1 from the first surface (e.g., the top surface) to a second surface (e.g., a bottom surface) of the optical channel 406-1. Further, the optical channel 406-1 may have a Fano resonance characteristic. Accordingly, the optical channel 406-1 may reflect (e.g., at the first surface of the optical channel 406-1) a second portion of the first set of light beams 418-2.

As further shown in FIG. 4B, the first portion of the first set of light beams 418-1 may transmit (after passing through the optical channel 406-1) toward the first set of sensor elements 414-1 and/or the second portion of the first set of light beams 418-2 may transmit (after being reflected by the first surface of the optical channel 406-1) toward the second set of sensor elements 414-2. Accordingly, at least some of the first set of sensor elements 414-1 may receive and determine information related to the first portion of the first set of light beams 418-1 (e.g., an intensity of the first portion of the first set of light beams 418-1) and/or at least some of the second set of sensor elements 414-2 may receive and determine information related to the second portion of the first set of light beams 418-2 (e.g., an intensity of the second portion of the first set of light beams 418-2). In some implementations, the plurality of sensor elements 414 may be configured to generate sensor data that indicates the information related to the first portion of the first set of light beams 418-1 and/or the information related to the second portion of the first set of light beams 418-2.

In some implementations, the second light emission device 412 may be configured to emit a set of light beams 420 toward the second surface (e.g., the bottom surface) of the security article 402 when the security article 402 is placed within the interrogation area of the security article reader system 408. The set of light beams 420 may include light beams associated with a broadband wavelength range (e.g., visible light, ultraviolet light, and/or infrared light) or, in some implementations, may include light beams associated with one or more particular wavelength ranges. For example, the set of light beams 420 may include a second set of light beams 422 that are associated with the first wavelength range (e.g., describe above in relation to the first set of light beams 418), a third set of light beams 424 that are associated with a second wavelength range, and/or other sets of light beams associated with other wavelength ranges. As shown in FIG. 4C, the second light emission device 412 may be configured to emit the set of light beams 420 toward the second surface of the optical component 404 that is included in the security article 402.

As further shown in FIG. 4C, at least some of the set of light beams 420 may be transmitted to a second surface of the optical channel 406-1 of the plurality of optical channels 406. As described above, the optical channel 406-1 may be configured to pass light associated with the first wavelength range (e.g., that is included in the broadband wavelength range associated with the set of light beams 420). Accordingly, the optical channel 406-1 may pass a first portion of the second set of light beams 422-1 (e.g., that is associated with the first wavelength range) through the optical channel 406-1 from the second surface (e.g., the bottom surface) to the first surface (e.g., the top surface) of the optical channel 406-1. Further, the optical channel 406-1 may not exhibit the Fano resonance characteristic for light beams that fall incident on the second surface (e.g., the bottom surface) of the optical channel 406-1. Accordingly, the optical channel 406-1 may reflect (e.g., at the second surface of the optical channel 406-1) at least a first portion of the third set of light beams 424-1 (e.g., that is associated with the second wavelength range).

As further shown in FIG. 4C, the first portion of the second set of light beams 422-1 may transmit (after passing through the optical channel 406-1) toward the second set of sensor elements 414-2 and/or the first portion of the third set of light beams 424-1 may transmit (after being reflected by the second surface of the optical channel 406-1) toward the first set of sensor elements 414-1. Accordingly, at least some of the first set of sensor elements 414-1 may receive and determine information related to the first portion of the third set of light beams 424-1 (e.g., an intensity of the first portion of the third set of light beams 424-1) and/or at least some of the second set of sensor elements 414-2 may receive and determine information related to the first portion of the second set of light beams 422-1 (e.g., an intensity of the first portion of the second set of light beams 422-1). In some implementations, the plurality of sensor elements 414 may be configured to generate sensor data that indicates the information related to the first portion of the second set of light beams 422-1 and/or the information related to the second portion of the second set of light beams 422-2.

In some implementations, the first light emission device 410 may be configured to emit the set of light beams 416 (e.g., toward the first surface of the security article 402 and/or the first surface of the optical component 404 of the security article 402) during a first time period. In some implementations, the second light emission device 412 may be configured to emit the set of light beams 420 (e.g., toward the second surface of the security article 402 and/or the second surface of the optical component 404 of the security article 402) during a second time period. The second time period may not be coextensive with the first time period. That is, the first light emission device 410 and the second light emission device 412 may sequentially emit the set of light beams 416 and the set of light beams 420, such that the optical channel 406-1 does not pass or reflect any portion of the set of light beams 416 when passing or reflecting one or more portions of the set of light beams 420 (or vice versa). In this way, the plurality of sensor elements 414 may generate more accurate sensor data related to the set of light beams 416 and/or the set of light beams 420 than would be generated otherwise (e.g., because the set of light beams 416 and/or the set of light beams 420 are not affected by interference or other optical issues that would result from the set of light beams 416 and/or the set of light beams 420 being emitted at a same time).

As shown in FIG. 4D, the plurality of sensor elements 414 may be associated with one or more processors 426 (e.g., that are included in the security article reader system 408). The one or more processors 426 may control the security article reader system 408 and/or other components of the security article reader system 408. For example, the one or more processors 426 may cause the first light emission device 410 to emit the set of light beams 416 (e.g., toward the first surface of the optical component 404 during the first time period) and/or may cause the second light emission device 412 to emit the set of light beams 420 (e.g., toward the second surface of the optical component 404 during the second time period). Further, the one or more processors 426 may cause the plurality of sensor elements 414 to generate the sensor data (e.g., during the first time period and/or the second time period).

As further shown in FIG. 4D, and as shown by reference number 428, the plurality of sensor elements 414 may provide the sensor data to the one or more processors 426. In this way, the one or more processors 426 may obtain and/or identify the sensor data. The sensor data may indicate, for each optical channel 406, of the plurality of optical channels 406, information relating to how the optical channel 406 interacted with the set of light beams 416 and/or the set of light beams 420. For example, for the optical channel 406-1, the sensor data may indicate the information related to the first portion of the first set of light beams 418-1 (e.g., that was passed by the optical channel 406-1), the information related to the second portion of the first set of light beams 418-2 (e.g., that was reflected by the first surface of the optical channel 406-1), the information related to the first portion of the second set of light beams 422-1 (e.g., that was passed by the optical channel 406-1), and/or the information related to the first portion of the third set of light beams 424-1 (e.g., that was reflected by the second surface of the optical channel 406-1), as described herein in relation to FIGS. 4B-4C.

As further shown in FIG. 4D, and by reference number 430, the one or more processors 426 may process the sensor data to determine one or more respective optical characteristics of the plurality of optical channels 406. For example, for the optical channel 406-1, the one or more processors 426 may identify a first portion of the sensor data (e.g., that includes the information related to the first portion of the first set of light beams 418-1) and/or a second portion of the sensor data (e.g., that includes the information related to the first portion of the second set of light beams 422-1) and may determine, based on the first portion of the sensor data and/or the second portion of the sensor data, a transmission characteristic associated with the optical channel 406-1 (e.g., a transmission performance of the optical channel 406-1). As another example, for the optical channel 406-1, the one or more processors 426 may identify a third portion of the sensor data (e.g., that includes the information related to the second portion of the first set of light beams 418-2), and may determine, based on the third portion of the sensor data, a reflection characteristic associated with the first side of the optical channel 406-1 (e.g., a reflection performance of the first side of the optical channel 406-1). In an additional example, for the optical channel 406-1, the one or more processors 426 may identify a fourth portion of the sensor data (e.g., that includes the information related to the first portion of the third set of light beams 424-1) and may determine, based on the fourth portion of the sensor data, a reflection characteristic associated with the second side of the optical channel 406-1 (e.g., a reflection performance of the second side of the optical channel 406-1).

As further shown in FIG. 4D, and by reference number 432, the one or more processors 426 may determine, based on the one or more respective optical characteristics of the plurality of optical channels 406, identification information associated with the optical component 404. In some implementations, the one or more processors 426 may identify a set of optical characteristics associated with an optical channel 406 and determine, based on the set of optical characteristics and/or a location of the optical channel 406 within the optical component 404, a value associated with the optical channel. For example, for the optical channel 406-1, the one or more processors 426 may identify and process a transmission characteristic associated with the optical channel 406-1, a first reflection characteristic associated with the first side of the optical channel 406-1, and/or a second reflection characteristic associated with a second side of the optical channel 406-1 to determine a 3-bit value (e.g., where a first bit corresponds to the transmission characteristic, a second bit corresponds to the first reflection characteristic, and a third bit corresponds to the second reflection characteristic, and each bit indicates whether its corresponding optical characteristic is present and/or satisfies an optical characteristic threshold). Additionally, or alternatively, the one or more processors 426 may add one or more bits to the 3-bit value to generate an n-bit value (e.g., where n>3, and the one or more bits indicate a location of the optical channel 406-1 within the optical component 404). In this way, the one or more processors 426 may determine respective n-bit values of the plurality of optical channels 406. The one or more processors 426 may process at least some of the respective n-bit values of the plurality of optical channels 406 to determine the identification information associated with the optical component 404. For example, the one or more processors 426 may concatenate a plurality of the n-bit values to generate an m-bit value (e.g., where m>n, and m is a multiple of n) that identifies the optical component 404. The identification information associated with the optical component 404 may include an identifier (e.g., a universally unique identifier (UUID)), a text string, a number string, and/or an alphanumeric string, among other examples, and the identifier may correspond to printed, displayed, and/or other information that is otherwise included in the secure article 402.

In some implementations, the one or more processors 426 may determine (e.g., based on the identification information associated with the optical component 404) whether the security article 402 is valid. For example, the one or more processors 426 may search a data structure (e.g., that is included in the security article reader system 408 or accessible to the security article reader system 408) that includes entries associated with valid security articles for an entry associated with the identification information. The one or more processors 426 may determine that the security article 402 is valid when the one or more processors 426 find an entry or may determine that the security article 402 is not valid when the one or more processors 426 do not find an entry.

In some implementations, the one or more processors 426 may cause (e.g., based on determining whether the security article 402 is valid) information indicating whether the security article is valid to be displayed on a display associated with the security article reader system 408 (e.g., to indicate that the security article 402 can be or cannot be used for a transaction, that a holder of the security article 402 can or cannot access a restricted area, and/or that a locked resource is to be unlocked or to remain locked, among other examples). In some implementations, the one or more processors 426 may cause (e.g., based on determining whether the security article 402 is valid) granting or denying access to a resource (e.g., a prescription drug, a hazardous material, and/or a restricted area, among other examples). For example, when the one or more processors 426 determined that the security article 402 is valid, the one or more processors 426 may send a signal to a device or component associated with the resource to cause the device or component to release the resource or otherwise allow a holder of the security article 402 access to the resource. As another example, when the one or more processors 426 determined that the security article 402 is not valid, the one or more processors 426 may send a signal to a device or component associated with the resource to cause the device or component to lock the resource (or to maintain a lock on the resource) or otherwise prevent a holder of the security article 402 from accessing the resource.

As indicated above, FIGS. 4A-4D are provided as examples. Other examples may differ from what is described with regard to FIGS. 4A-4D.

FIG. 5 is a diagram of example components of a device 500, which may correspond to the security article reader system 408. In some implementations, the security article reader system 408 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
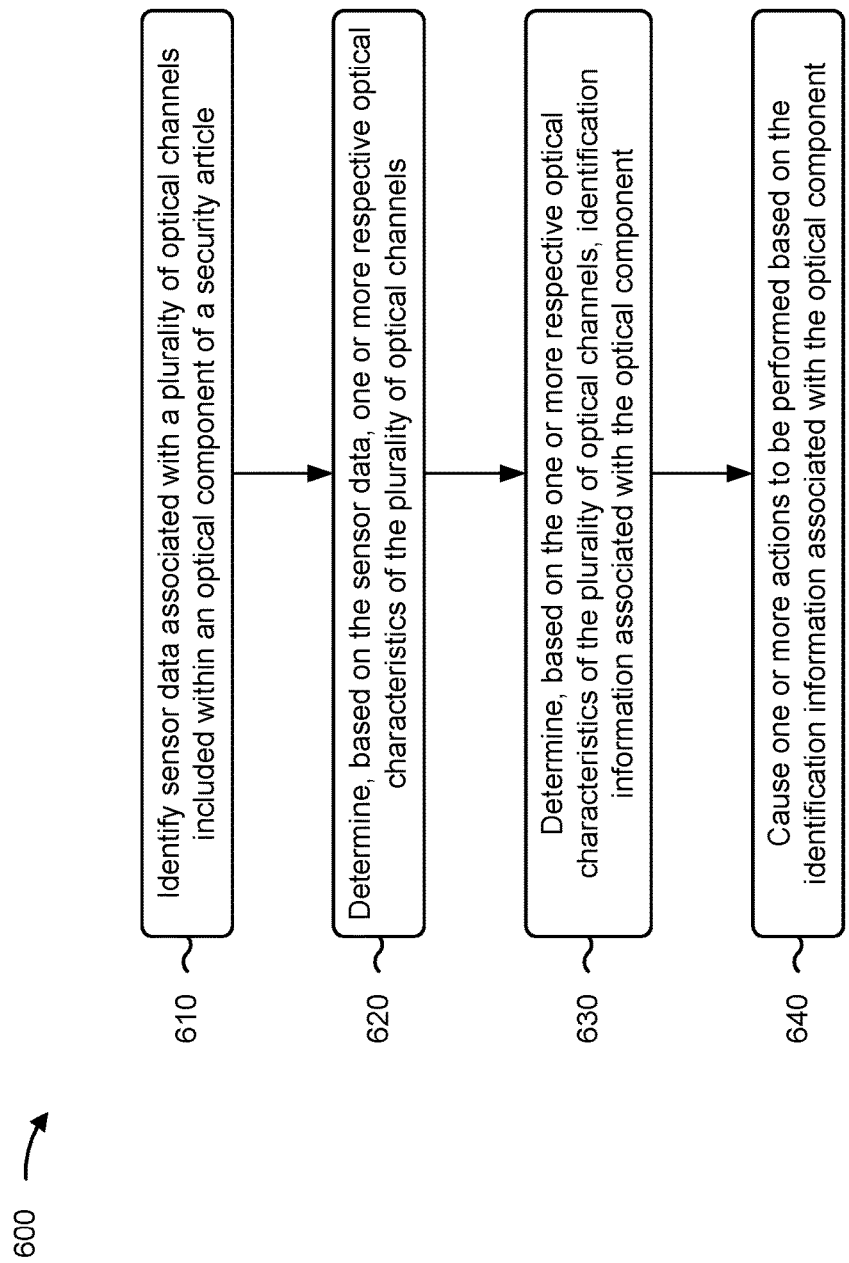
FIG. 6 is a flowchart of an example process relating to an optical component of a security article.

FIG. 6 is a flowchart of an example process 600 associated with an optical component of a security article. In some implementations, one or more process blocks of FIG. 6 may be performed by a security article reader system (e.g., security article reader system 408). In some implementations, one or more process blocks of FIG. 6 may be performed by another device or a group of devices separate from or including the security article reader system. Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include identifying sensor data associated with a plurality of optical channels included within an optical component of a security article (block 610). For example, the security article reader system may identify sensor data associated with a plurality of optical channels included within an optical component of a security article, as described above.

As further shown in FIG. 6, process 600 may include determining, based on the sensor data, one or more respective optical characteristics of the plurality of optical channels (block 620). For example, the security article reader system may determine, based on the sensor data, one or more respective optical characteristics of the plurality of optical channels, as described above.

As further shown in FIG. 6, process 600 may include determining, based on the one or more respective optical characteristics of the plurality of optical channels, identification information associated with the optical component (block 630). For example, the security article reader system may determine, based on the one or more respective optical characteristics of the plurality of optical channels, identification information associated with the optical component, as described above.

As further shown in FIG. 6, process 600 may include causing one or more actions to be performed based on the identification information associated with the optical component (block 640). For example, the security article reader system may cause one or more actions to be performed based on the identification information associated with the optical component, as described above.

Process 600 may include additional implementations, such as any single implementation or any combination of implementations described below and/or in connection with one or more other processes described elsewhere herein.

In a first implementation, process 600 includes causing a first light emission device of the security article reader system to emit a first set of light beams toward a first surface of the optical component during a first time period, causing a second light emission device of the security article reader system to emit a second set of light beams toward a second surface of the optical component during a second time period, wherein the first time period and the second time period are not coextensive, and causing a plurality of sensor elements of the security article reader system to generate the sensor data during the first time period and the second time period.

In a second implementation, alone or in combination with the first implementation, determining the one or more respective optical characteristics of the plurality of optical channels comprises identifying, for an optical channel, of the plurality of optical channels, at least one of a first portion of the sensor data that is associated with a first subset of light beams of a first set of light beams that is reflected by a first side of the optical channel, a second portion of the sensor data that is associated with a second subset of light beams of the first set of light beams that is passed by the optical channel, a third portion of the sensor data that is associated with a first subset of light beams of a second set of light beams that is passed by the optical channel, or a fourth portion of the sensor data that is associated with a second subset of light beams of the second set of light beams hat is reflected by a second side of the optical channel, and determining, based at least one of the first portion of the sensor data, the second portion of the sensor data, the third portion of the sensor data, or the fourth portion of the sensor data, one or more optical characteristics of the optical channel.

In a third implementation, alone or in combination with one or more of the first and second implementations, the one or more respective optical characteristics of the plurality of optical channels includes, for an optical channel, of the plurality of optical channels, at least one of a reflection characteristic associated with a first side of the optical channel, a transmission characteristic associated with the optical channel, or a reflection characteristic associated with a second side of the optical channel.

In a fourth implementation, alone or in combination with one or more of the first through third implementations, determining the identification information associated with the optical component comprises identifying, based on the one or more respective optical characteristics of the plurality of optical channels, a first set of optical characteristics associated with a first optical channel, of the plurality of optical channels, and a second set of optical characteristics associated with a second optical channel, of the plurality of optical channels, determining, based on the first set of optical characteristics and/or a location of the first optical channel, a first value associated with the first optical channel, determining, based on the second set of optical characteristics and/or a second location of the second optical channel, a second value associated with the second optical channel, and determining, based on the first value and the second value, the identification information associated with the optical component.

In a fifth implementation, alone or in combination with one or more of the first through fourth implementations, causing the one or more actions to be performed comprises determining, based on the identification information associated with the optical component, whether the security article is valid, and granting or denying access to a resource based on determining whether the security article is valid.

In a sixth implementation, alone or in combination with one or more of the first through fifth implementations, determining the one or more respective optical characteristics of the plurality of optical channels comprises determining, based on the sensor data, a reflection characteristic associated with a first side of an optical channel of the plurality of optical channels; determining, based on the sensor data, a transmission characteristic associated with the optical channel; and determining, based on the sensor data, a reflection characteristic associated with a second side of the optical channel.

In a seventh implementation, alone or in combination with one or more of the first through sixth implementations, causing the one or more actions to be performed comprises determining, based on the identification information associated with the optical component, whether the security article is valid, and causing information indicating whether the security article is valid to be displayed on a display associated with the security article reader system.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A security article comprising:
  an optical component that includes a plurality of optical channels with a Fano resonance characteristic, wherein:
    a number of optical channels, of the plurality of optical channels, is greater than or equal to a threshold number of optical channels,
    an optical channel, of the plurality of optical channels, is configured to:
      pass a first portion of a first set of light beams when the first set of light beams falls incident on at least one of a first surface or a second surface of the optical channel,
        wherein the first set of light beams is associated with a first wavelength range;
      reflect a second portion of the first set of light beams when the first set of light beams falls incident on the first surface of the optical channel; and
      reflect at least a portion of a second set of light beams when the second set of light beams falls incident on the second surface of the optical channel,
        wherein the second set of light beams is associated with a second wavelength range, and
    the optical channel includes an absorber layer comprising germanium, silicon, amorphous silicon, silicon-germanium, a metallic oxide, a telluride, a sulfide, an arsenide, a phosphide, or an antimonide.

2. The security article of claim 1, wherein the optical channel is further configured to:
  prevent the second set of light beams from passing through the optical channel when the second set of light beams falls incident on at least one of the first surface or the second surface of the optical channel.

3. The security article of claim 1, wherein the optical channel further includes:
  a first mirror;
  a set of spacer layers disposed on the first mirror; and
  a second mirror disposed on the set of spacer layers,
    wherein the absorber layer is disposed on one of the first mirror or the second mirror, and
    wherein the first surface of the optical channel comprises a surface of the absorber layer.

4. The security article of claim 1, wherein the threshold number of optical channels is greater than or equal to five.

5. The security article of claim 1, wherein an additional optical channel, of the plurality of optical channels, is configured to:
pass a first portion of a third set of light beams when the third set of light beams falls incident on at least one of a first surface or a second surface of the additional optical channel,
wherein the third set of light beams is associated with a third wavelength range;
reflect a second portion of the third set of light beams when the third set of light beams falls incident on the first surface of the additional optical channel; and
reflect at least a portion of a fourth set of light beams when the fourth set of light beams falls incident on the second surface of the additional optical channel.

6. The security article of claim 5, wherein:
the first surface of the optical channel and the first surface of the additional optical channel are included in a particular surface of the optical component.

7. The security article of claim 5, wherein:
the first surface of the optical channel is included in a first surface of the optical component; and
the first surface of the additional optical channel is included in a second surface of the optical component.

8. The security article of claim 1, wherein the absorber layer comprises two or more of the amorphous silicon, the silicon-germanium, the metallic oxide, the telluride, the sulfide, the arsenide, the phosphide, or the antimonide.

9. The security article of claim 1, wherein the optical channel further includes one or more mirrors, and
wherein the absorber layer is disposed on one or more of the one or more mirrors.

10. A method, comprising:
passing, by an optical channel of a plurality of optical channels of an optical component of a security article, a first portion of a first set of light beams when the first set of light beams falls incident on at least one of a first surface or a second surface of the optical channel,
wherein the optical channel includes an absorber layer comprising germanium, silicon, amorphous silicon, silicon-germanium, a metallic oxide, a telluride, a sulfide, an arsenide, a phosphide, or an antimonide, and
wherein the first set of light beams is associated with a first wavelength range;
reflecting, by the optical channel, a second portion of the first set of light beams when the first set of light beams falls incident on the first surface of the optical channel; and
reflecting, by the optical channel, at least a portion of a second set of light beams when the second set of light beams falls incident on the second surface of the optical channel,
wherein the second set of light beams is associated with a second wavelength range.

11. The method of claim 10, wherein the plurality of optical channels have a Fano resonance characteristic.

12. The method of claim 10, wherein a number of optical channels, of the plurality of optical channels, is greater than or equal to a threshold number of optical channels, and
wherein the threshold number of optical channels is greater than or equal to five.

13. The method of claim 10, further comprising:
preventing the second set of light beams from passing through the optical channel when the second set of light beams falls incident on at least one of the first surface or the second surface of the optical channel.

14. The method of claim 10, further comprising:
passing, by an additional optical channel of the plurality of optical channels, a first portion of a third set of light beams when the third set of light beams falls incident on at least one of a first surface or a second surface of the additional optical channel,
wherein the third set of light beams is associated with a third wavelength range;
reflecting, by the additional optical channel, a second portion of the third set of light beams when the third set of light beams falls incident on the first surface of the additional optical channel; and
reflecting, by the additional optical channel, at least a portion of a fourth set of light beams when the fourth set of light beams falls incident on the second surface of the additional optical channel,
wherein the second set of light beams is associated with a second wavelength range.

15. The method of claim 10, wherein the optical channel further includes one or more mirrors, and
wherein the absorber layer is disposed on one or more of the one or more mirrors.

16. An optical component for a security article, the optical component comprising:
a first optical channel; and
a second optical channel,
the first optical channel being is configured to:
pass a first portion of a first set of light beams when the first set of light beams falls incident on at least one of a first surface or a second surface of the optical channel,
the first set of light beams being associated with a first wavelength range;
reflect a second portion of the first set of light beams when the first set of light beams falls incident on the first surface of the optical channel; and
reflect at least a portion of a second set of light beams when the second set of light beams falls incident on the second surface of the optical channel,
the second set of light beams being associated with a second wavelength range, and
the first optical channel including an absorber layer comprising germanium, silicon, amorphous silicon, silicon-germanium, a metallic oxide, a telluride, a sulfide, an arsenide, a phosphide, or an antimonide.

17. The optical component of claim 16,
wherein the first optical channel further includes one or more mirrors, and
wherein the absorber layer is disposed on one or more of the one or more mirrors.

18. The optical component of claim 17,
wherein the one or more mirrors include a first mirror and a second mirror,
wherein the first optical channel further includes a set of spacer layers disposed on the first mirror, and
wherein the second mirror is disposed on the set of spacer layers.

19. The optical component of claim 16,
wherein the optical component includes a plurality of optical channels with a Fano resonance characteristic, and
wherein the plurality of optical channels include the first optical channel and the second optical channel.

20. The optical component of claim 16,
wherein the optical component includes a plurality of optical channels, wherein the plurality of optical channels include the first optical channel and the second optical channel, and wherein a number of optical channels, of the plurality of optical channels, is greater than or equal to five.

* * * * *